(12) United States Patent
Butler et al.

(10) Patent No.: US 11,274,684 B2
(45) Date of Patent: Mar. 15, 2022

(54) METHOD FOR DETERMINING THE HEALTH STATUS OF THE HYDRAULIC CIRCUIT ARRANGEMENT

(71) Applicant: Danfoss Power Solutions, Inc., Ames, IA (US)

(72) Inventors: Molli Butler, Ames, IA (US); Marcus Herrera, Ames, IA (US)

(73) Assignee: DANFOSS POWER SOLUTIONS INC., Ames, IA (US)

( * ) Notice: Subject to any disclaimer, the term of this patent is extended or adjusted under 35 U.S.C. 154(b) by 0 days.

(21) Appl. No.: 16/292,949

(22) Filed: Mar. 5, 2019

(65) Prior Publication Data

US 2020/0284275 A1 Sep. 10, 2020

(51) Int. Cl.
*F15B 19/00* (2006.01)
*G08B 21/24* (2006.01)
*G05B 19/042* (2006.01)

(52) U.S. Cl.
CPC ........ *F15B 19/005* (2013.01); *G05B 19/0428* (2013.01); *G08B 21/24* (2013.01); *G05B 2219/24015* (2013.01); *G05B 2219/25312* (2013.01)

(58) Field of Classification Search
CPC .............. F15B 19/005; G05B 19/0428; G05B 2219/24015; G05B 2219/25312; G08B 21/24
See application file for complete search history.

(56) References Cited

U.S. PATENT DOCUMENTS

| | | | |
|---|---|---|---|
| 2003/0177986 A1* | 9/2003 | Le Lievre | F01P 7/167 123/41.31 |
| 2005/0262838 A1* | 12/2005 | Kageyama | E02F 9/226 60/453 |
| 2007/0104986 A1* | 5/2007 | Tighe | H01M 8/04029 429/434 |
| 2008/0236153 A1* | 10/2008 | St. Aubin | F16H 61/4104 60/327 |
| 2009/0095576 A1* | 4/2009 | Miller | B64C 25/42 188/1.11 E |
| 2010/0030496 A1 | 2/2010 | Vianna | |
| 2010/0152925 A1* | 6/2010 | Goupil | G05B 17/02 701/3 |

(Continued)

FOREIGN PATENT DOCUMENTS

| | | |
|---|---|---|
| CA | 2848893 A1 | 6/2010 |
| CN | 103591084 A | 2/2014 |

(Continued)

OTHER PUBLICATIONS

International Search Report for Serial No. PCT/US2020/020877 dated Jul. 16, 2020.

*Primary Examiner* — Sisay Yacob
(74) *Attorney, Agent, or Firm* — McCormick, Paulding & Huber PLLC

(57) ABSTRACT

The invention relates to a method (25) of determining the health status of a hydraulic circuit arrangement comprising at least one hydraulic fluid working machine (2, 3). The health status is determined (29) using at least in part an actual temperature information (12) of the hydraulic circuit arrangement (1) that is compared to an expected temperature information (24) of the hydraulic circuit arrangement (1).

20 Claims, 3 Drawing Sheets

(56) References Cited

U.S. PATENT DOCUMENTS

2018/0058482 A1* 3/2018 Carpenter ............... E02F 9/268
2018/0119713 A1* 5/2018 Kloda .................... F04B 51/00

FOREIGN PATENT DOCUMENTS

| CN | 104819144 | A  | 8/2015  |
|----|-----------|----|---------|
| EP | 0307974   | A2 | 3/1989  |
| EP | 1227377   | A2 | 7/2002  |
| EP | 2818720   | A2 | 12/2014 |
| EP | 2960529   | A1 | 12/2015 |
| JP | 2013002425| A  | 1/2013  |

* cited by examiner

METHOD FOR DETERMINING THE HEALTH STATUS OF THE HYDRAULIC CIRCUIT ARRANGEMENT

TECHNICAL FIELD

The invention relates to a method of determining the health status of a hydraulic circuit arrangement. Also, the invention relates to a control unit for a hydraulic circuit arrangement, as well as to a hydraulic circuit arrangement that employs a method for determining its health status.

BACKGROUND

Technical equipment, in particular technical equipment that comprises mechanically moving parts, only shows a certain lifespan, after which it will become unreliable and/or less effective. Eventually, the equipment will break or at least deteriorate to a level that it is effectively not usable any more.

Usually, an unexpected breakdown of the equipment is quite problematic. Not only that the productivity of the respective equipment decreases significantly, regularly down to zero, at a possibly problematic point in time but usually the equipment has to be retrieved and/or repaired under problematic conditions as well.

The well-established solution for this is regular maintenance, in particular regular preventive maintenance. Here, components are exchanged before they exceed a certain level of probability that they will fail. This way, the probability that the overall equipment will unexpectedly fail during use will drop to an accordingly low level. The level of probability for unexpected failure is mainly chosen depending on the priority of the respective equipment.

This approach is well known to anybody. A car, for example, needs maintenance at regular intervals. Typically, the maintenance intervals are scheduled on a certain allowed kilometrage and a certain allowed time span between maintenance actions, whatever comes first. This way, an unexpected breakdown on a road occurs only rarely.

While this simple approach works decently well in practice, it also has some disadvantages. A major problem is that individual wear is not considered in such a fixed schedule. As an example, if a car, always pulling a heavy trailer, is primarily used in mountaneous areas, the wear of its components is significantly higher as compared to a little loaded car that is primarily used on well-built rural roads with little traffic and few curves and intersections. While in the first described case the probability for a breakdown increases above the standard probability level, in the second example parts are replaced too early—and thus unnecessarily—wasting time and money for unnecessary maintenance works.

This problem has already been addressed in the art, using various approaches.

A possible approach is to use data, describing the actual performance of the equipment in use. If the actually requested performance is higher than an expected average value, the maintenance intervals are shortened, while the maintenance intervals are prolonged if the actually requested performance is lower than an expected average value. To revert to the example of a car: if the average power that is called from a car's engine is higher than a design reference value, the maintenance intervals are shortened. This will be indicated to the driver by an appropriate indication in the cockpit.

The problem with this approach is that it does not directly consider the wear of the respective component/components. Instead, the wear is approximated based on a model of the respective component. Just to use an example again, if the material of a certain component shows some undetected weaknesses, the actual (possibly significantly increased) wear of the respective component will not be known and a failure can nevertheless occur.

To alleviate the problems, it has also been suggested to measure the actual wear of the component/components in question directly. Consequently, the components are only replaced if there is really a need for an exchange. A simple example for this is to measure the thickness of a brake pad. If a certain lower limit of its thickness is reached or exceeded, it will be replaced.

While this approach yields good results in practice, it nevertheless shows disadvantages in that usually additional sensors are required. These sensors are always a cost factor, and they do need a certain mounting space. Also, the respective sensor might be a cause of defects, when it shows erroneous data. Therefore, an excessive use of sensors is also problematic.

Therefore, there is a need in the art to acquire data that describes the actual health status of a system as precise as possible, while using as little sensor data (in particular sensor data from sensors that have to be provided solely for this purpose) at the same time. Certainly, these two contradicting requirements always do call for a certain compromise. Therefore, there is still much room for improvements.

SUMMARY

The object of the invention is therefore to suggest a method of determining the health status of a hydraulic circuit arrangement that is improved over methods of determining the health status of a hydraulic circuit arrangement that are known in the state of the art. Another object of the invention is to provide a control unit for operating a hydraulic circuit arrangement that is improved over control units for operating hydraulic circuit arrangements that are known in the state of the art. Yet another object of the invention is to provide a hydraulic circuit arrangement that is improved over hydraulic circuit arrangements that are known in the state of the art.

The presently proposed method, control unit, and hydraulic circuit arrangement solve these problems.

According to a first aspect of the invention, a method of determining the health status of hydraulic circuit arrangement, in particular of a hydraulic circuit arrangement comprising at least one hydraulic fluid working machine, is suggested. The health status is determined using at least in part an actual temperature information of the hydraulic circuit arrangement that is compared to an expected temperature information of the hydraulic circuit arrangement. Surprisingly, by using such input data in part/mainly/(essentially) exclusively, it is possible to determine a surprisingly precise health status of the hydraulic circuit arrangement that is monitored by the suggested method. Another particular advantage of the presently suggested method is that the sensors that are required to employ the method are comparatively cheap, precise and reliable. In most cases, temperature sensors are present in hydraulic circuit arrangements for monitoring purposes already. Therefore, potentially no additional sensors are needed. Even in case the already present sensor is not sufficient for the presently suggested method (for example the precision of the measured values is not sufficiently high), an exchange of an unprecise temperature sensor that has to be used in any case by a (slightly) more elaborate temperature sensor is easy to realise and usually cheap to achieve. In certain cases, additional information (apart from the temperature information) might prove to be sensible. This additional information can come from a control input, from databases or from additional sensors, just to name some examples. Using such additional information, it is usually possible to obtain a health status that is more precise. It should be noted that even in case additional sensors are used, it is normally possible to use less precise sensors (in particular for the additional information) that are usually less costly and/or it is possible to reduce the number of additional sensors (which has an appropriate cost advantage, as well). In particular, in most cases it is possible to use already present mechanical hardware in combination with the presently proposed method. Even in case some modifications have to be made to the presently used hardware, those modifications are usually only necessary on a minuscule level (if at all). Since nowadays hydraulic circuit arrangements usually do have an electronic control circuitry already, it is quite often possible to use the presently existing hardware to perform the presently suggested method as well. Sometimes, it might be necessary to use a somewhat more powerful electronic controller (or similar device). In such a case, an appropriately more powerful electronic device can be used. Such a replacement, however, is usually easy to achieve and comparatively cheap to realise. Even in case an additional/separate electronic circuitry (in particular an electronic controller) has to be used for employing the presently suggested method, this can usually be realised in a very cost-effective way as well. Only for completeness it should be mentioned that using a separate electronic circuitry/electronic controller for the presently proposed method might show certain advantages that might easily outrun the burden of additional cost. In particular, a higher reliability of the method can usually be guaranteed by such an arrangement. Since the presently proposed method usually necessitates only minuscule modifications of the hardware arrangement—if at all —, the presently proposed method can even be used as a drop-in-solution and/or as an easy to realise possible upgrade for already used machinery. How the actual temperature information and/or the expected temperature information is obtained is essentially arbitrary. Of course, a suitable selection and/or modification of the respective information is suggested, wherein the selection/modification might depend on the actually used hydraulic circuit arrangement and the environment it is used in. Furthermore, an appropriate selection/modification of the information used and/or the way the health status is determined can be made based on the required or desired preciseness of the health status. Furthermore, the method for determining the health status can be employed for a plethora of hydraulic circuit arrangements, as will be elucidated in more detail later on.

While essentially all types of sensible expected temperature information can be used, it is preferred if the expected temperature information is determined, at least in part, from the following group of temperature information gaining methods: using a fixed temperature; using a temperature that is based on a model of the hydraulic circuit arrangement; using a temperature that is based on measurements made on a hydraulic circuit arrangement; modifying the temperature based on operating time; modifying the temperature based on operating load; modifying the temperature based on operating load history; modifying the temperature based on environmental parameters; modifying the temperature based on actual temperature information history; modifying the temperature based on the type of hydraulic fluid; modifying the temperature based on hydraulic fluid alterations; modifying the temperature based on previous health status data. Using one or several of the previous proposals, it is possible to determine a more precise health status. In particular, a variety of influences can be considered in this way. Just to give some examples: if a high power level is required from the hydraulic circuit, the actual temperature will usually vary with the required load as well. However, the actual temperature change will usually vary in a non-linear way with the actual wear of the hydraulic circuit arrangement. Modifying the expected temperature information can be used to reflect this non-linearity. The same idea applies mutatis mutandis to other influences, for example to environmental influences, hydraulic fluid viscosity and so on. In particular by using any kind of history data of the hydraulic circuit arrangement, it is possible to consider a typical wear behaviour over time of the hydraulic circuit arrangement (and their respective components) when determining the health status. As a typical example: when using brand-new components that comprise mechanically moving parts, they will usually show a somewhat higher friction initially, thus generating more heat. The friction—and thus the temperature generated—will typically decrease in the beginning due to running-in effects. Then, a typical behaviour is that components will show an essentially uniform friction/generation of heat for a prolonged time. Usually, at the end of the life cycle of the respective components, their friction and thus the generated heat will increase again, indicating a deteriorating health status. When talking about "friction", this wording can also include or even substitute (at least in part) different heat generating effects, like increased fluid losses due to an increased play of the respective components, and the like. At least for some of the previously mentioned expected temperature information determination method (in particular modification of an "initial" temperature information), at least one additional sensor might prove to be advantageous or even necessary.

Typically the quality of the health status information can be increased even further if the actual temperature information is determined, at least in part, from the following group of temperature information gaining methods: measuring the hydraulic fluid temperature; measuring the temperature development over time; measuring the mechanical power introduced into the hydraulic circuit arrangement; measuring the mechanical power extracted from the hydraulic circuit arrangement; measuring heat dissipation of the hydraulic circuit arrangement to the environment; replacing or modifying a measurement by calculations. It is to be understood that not only a single one, but instead two or a plurality of the aforementioned temperature information gaining methods can be employed. In particular, typical (major) side-effects on the measured value of the actual temperature can be accounted for. Additionally, the previously described non-linearity between actual wear of the hydraulic circuit arrangement (components) and the temperature information applies mutatis mutandis to the actual temperature information (i.e. not only to the expected temperature information). At least for some of the previously mentioned actual temperature infor-mation determination method (in particular modification of an "initial" temperature information), at least one additional sensor might prove to be ad-vantageous or even necessary.

Preferably, the determined health status can be grouped, the group may comprise at least one, two or a plurality of health status level(s). In particular, the at least one, two or plurality of health status level(s) can be taken from the following group of health status levels: indication of full operability of the hydraulic circuit arrangement; indication of remaining hours of full operability of the hydraulic circuit arrangement; remaining operating hours before preventive maintenance; remaining hours before maintenance; indication of suggested preventive maintenance; indication of required preventive maintenance; indication of suggested maintenance; indication of recommended maintenance; indication of highly recommended maintenance; indication of recommended non-use of equipment; indication of imminent malfunction; indication of malfunction. It is to be understood that different health status levels or any other type of health status can be used instead and/or in addition to the previously given non-exhaustive list. Nevertheless, the indicated health status levels typically are of an advantageously informative character for the operator and/or the operating facility of the hydraulic circuit arrangement in question. In particular, it is to be noted that sometimes an urgent need for using an hydraulic circuit arrangement might be present that can justify a continued use of the arrangement, despite an (possibly even significantly) increased possibility of failure. On the contrary, during a time when the hydraulic circuit arrangement in question will hardly be used (if at all) anyhow, an early maintenance might make sense, so as to have an hydraulic circuit arrangement at hand that can be operated for an extensive time, in case of a future need.

First experiments showed that it is particularly advantageous if the health status is influenced by previous health status information. This way, the health status can be of a somewhat integrative nature. In particular, nonlinearity effects of actual use and actual wear during the history of use of the hydraulic circuit arrangement can be considered.

It is furthermore suggested that the health status can be externally modified, in particular based on inspection results and/or on maintenance performed. As an example, if a component has been serviced or exchanged, the health status should usually be reset at the workshop to a brand-new status (similarly: refurbished status, serviced status, a "maintenance performed" status, and the like), so that an increased actual temperature that is due to higher friction of the respective component during the wear-in phase of the respective component will not trigger a false alarm concerning the health status. This applies mutatis mutandis for some kind of reworking or some kind of maintenance performed on one or several components, or the like.

Furthermore, it is suggested to determine the health status, at least in part, using machine learning methodologies, processes and systems. This way, a steady improvement of the quality of the determined health status can be achieved. Furthermore, the quality of the determined health status can be increased in light of the actual operating characteristics of the hydraulic circuit arrangement. It is to be noted that it is very common that an off-the-shelf hydraulic circuit arrangement will be used differently, depending on the customer and/or the site, the hydraulic circuit arrangement is used in. Those dependencies can hardly be predicted by the manufacturer of the hydraulic circuit arrangement—if at all. Nevertheless, using the proposed embodiment, is possible to take into account such peculiarities, at least on the long-term scale.

It is further suggested that the health status is indicated to an operator of the hydraulic circuit arrangement, is stored in a memory device for readout by a person, and/or is transmitted to an external device. This way the versatility of the method can be increased in a variety of ways. The question as to whether where to transmit the health status can depend on the health status level that is determined. As an example: the remaining hours of full operability of the hydraulic circuit arrangement might not be of major interest to the operator of the arrangement (for avoiding an information overload), so that the respective information is only stored for readout/transmitted to an external device, so that a sensible maintenance plan can be scheduled (that can take into account the availability of maintenance facilities as well, just to give an example). A warning, indicating a malfunction or an imminent malfunction, however, is very pertinent to be shown to the operator of the arrangement. A red light for this might be the correct solution. Since the operator will most likely notify such a condition anyhow, a transmittal of the respective information to an external device might not be necessary at all (although this is of course still possible).

Furthermore, it is usually particularly advantageous if the health status and/or the expected temperature information and/or other actual temperature information is a vectorial value. This way, an even higher quality of the suggested method, in particular of the health status to be determined is possible. A vectorial health status might give a different health status level for at least two, a plurality, the majority or (essentially) all (different) components of the hydraulic circuit arrangement, the presently proposed method is used for. Therefore, the health status can take into account a different wear of the respective components. The same applies mutatis mutandis to external temperature information and/or the actual temperature information.

According to another aspect of the present invention, a control unit for a hydraulic circuit arrangement is suggested, where the control unit is designed and arranged in a way to perform, at least at times, a method according to to the previous description. This way, the control unit can show the same features and advantages as previously described, at least in analogy. It is to be noted that the control unit can be modified in the previously described sense as well, at least in analogy, usually yielding similar results and advantages as previously described, at least an analogy.

In particular it is proposed that the control unit is an electronic control unit, a programmable control unit, an electronic controller, and/or a device comprising a numerical processing device. Such units are typically very versatile for employing the previously described method. Furthermore, they are available off the shelf and are typically comparatively cheap.

According to yet another aspect of the present invention, a hydraulic circuit arrangement is proposed, where the hydraulic circuit arrangement is operated, at least at times, according to the previously suggested method and/or wherein the hydraulic circuit arrangement comprises a control unit according to the previous suggestion. Such a hydraulic circuit arrangement will usually show the same features and advantages, as previously described, at least in analogy. Furthermore, the hydraulic circuit arrangement can usually be modified in the previously described sense, at least in analogy, usually yielding similar results and advantages, as previously described, at least in analogy.

In particular, the presently proposed hydraulic circuit arrangement can be used for a mobile device, in particular for an off-road vehicle and/or a construction site vehicle. When used in this connection, the hydraulic circuit arrangement can take advantage of the intrinsic features of the present method and/or control unit in a particularly advantageous way, yielding typically superior results.

It is to be understood that it shall be possible that various features, as disclosed within the present application, may be combined with each other, even if such a combination is not expressly stated. Even further, it shall be possible that some features of the detailed embodiments may be combined with the claims, even without including a plurality or even (essentially) all of the features of the respective detailed embodiment into the respective claim(s). Further, it shall be possible to combine the features of various/several claims, even if no explicit back reference is indicated in the respective claim(s).

BRIEF DESCRIPTION OF THE DRAWINGS

Further advantages, features, and objects of the invention will be apparent from the following detailed description of the invention in conjunction with the associated drawings, wherein the drawings show.

DETAILED DESCRIPTION

Figure 1:
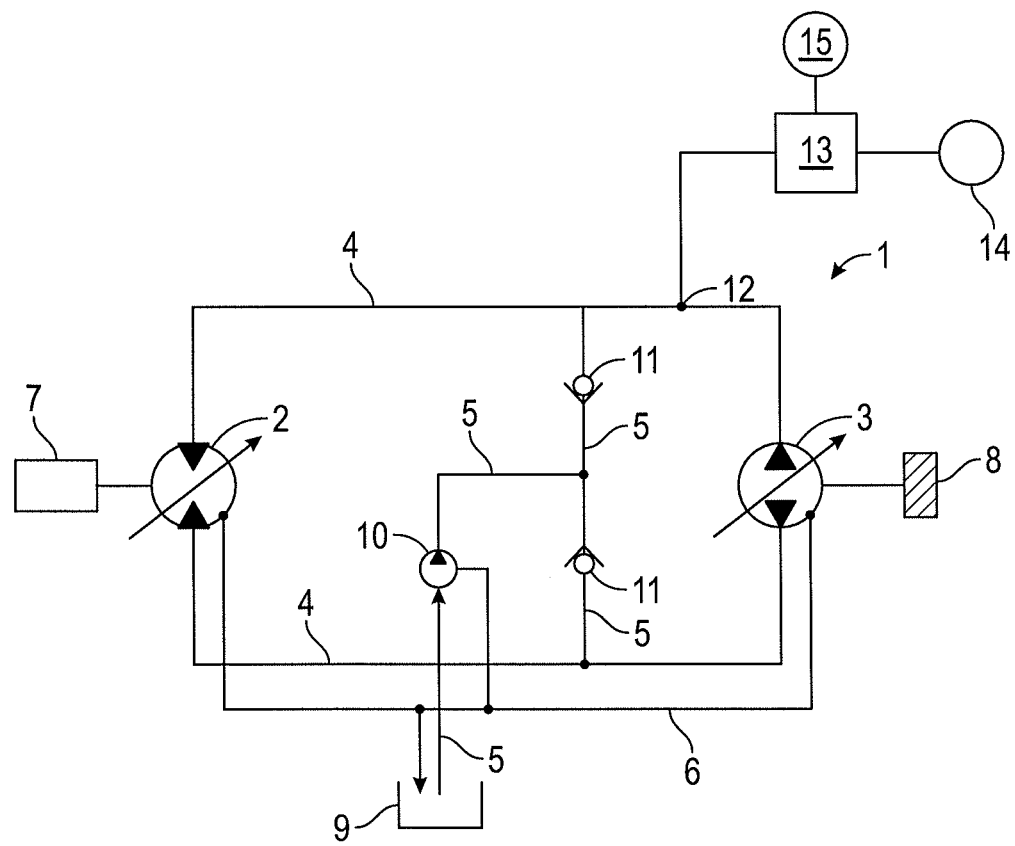
FIG. 1: a possible embodiment of a hydraulic circuit arrangement of a closed loop hydraulic arrangement in a schematic drawing.

In FIG. 1 a typical implementation of hydraulic circuit arrangement 1 is shown as a schematic circuitry. Namely, in FIG. 1 a closed loop hydraulic system 1 is shown. As usual, the closed loop hydraulic system 1 consists essentially of a main hydraulic pump 2 and a hydraulic motor 3 that are interconnected by main hydraulic fluid lines 4. The majority of the hydraulic fluid flux is confined to those main hydraulic fluid lines 4. The remaining fluid lines 5, 6 are confined to a comparatively low percentage of the overall fluid flux, as will be described later on.

In the presently shown embodiment of a closed loop hydraulic system 1, both the main hydraulic pump 2 and the main hydraulic motor 3 are variable (for example a swash plate pump/motor, a wobble plate pump/motor, or the like). However, this is to be seen as an optional feature of the respective devices 2, 3.

The main hydraulic pump 2 is presently driven by a prime mover 7, for example an internal combustion engine. The main hydraulic motor 3 is connected to a mechanical load, for example the driving axle 8 of the vehicle (only schematically drawn).

Since in hydraulic systems, a certain leakage of oil can never be completely avoided, a hydraulic fluid collection line 6 is present. In the schematics shown, the hydraulic fluid collecting line 6 is only connected to the casings of the main hydraulic pump 2, the main hydraulic motor 3, and the charging pump 10. However, it can be connected to additional hydraulic consumers, to joints of fluid lines and so on; in particular, wherever a certain leakage of hydraulic fluid is to be expected. The hydraulic fluid collecting line 6 returns the thus collected leakage oil back to a fluid reservoir 9.

To account for the fluid leakage losses, a charging pump 10 intakes hydraulic fluid from the fluid reservoir 9 and feeds it back into the main hydraulic circuit 4 (presently one of the main hydraulic fluid lines 4) through a hydraulic fluid replenishing line 5 and appropriately arranged check valves 11. Such an arrangement is well known in the state of the art. Only for completeness it should be mentioned that the charging pump 10 can be driven by the prime mover 7 (in particular through a common shaft; not shown) or any other type of mechanical power source.

Furthermore, in the presently shown embodiment, a temperature sensor 12 is arranged in one of the main hydraulic fluid lines 4. The temperature data collected by the temperature sensor 12 is fed to an electronic controller 13. The electronic controller 13 can be foreseen solely for this purpose. However, it is also possible that the necessary calculations will be done by an electronic controller 13 that is shared for providing several functionalities.

The electronic controller 13 compares the actual temperature data from the temperature sensor 12 and compares it with a reference temperature value. Based on the difference, a health status is calculated and output/delivered to an annunciator panel 14. To be able to calculate a precise health status, the determination of the health status is not only influenced by the bare temperature difference between actual temperature value and reference temperature value, but instead certain additional influences are considered, like previous temperature development, operating hours passed, the development of the previous health status, and the like. This additional data can be stored in and retrieved from a memory 15, for example a flash memory 15 that can store the data contained therein, even if the memory 15 is temporarily disconnected from an electrical power source.

Figure 2:
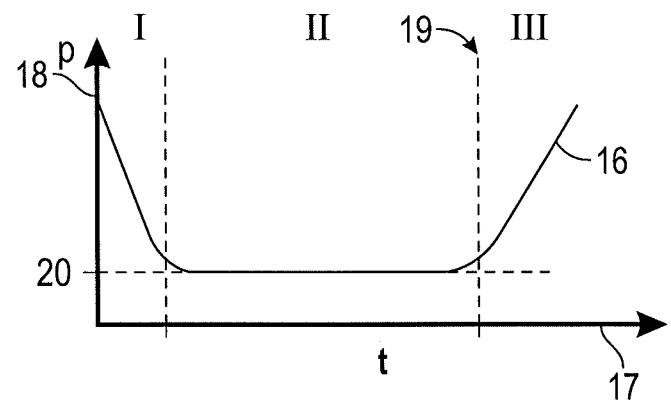
FIG. 2: a schematic sketch of the failure probability of a hydraulic circuit arrangement in dependence of the operating time.

FIG. 2 shows a typical development of a failure rate 16 of a hydraulic circuit arrangement 1 over time. The failure rate 16 is plotted along the ordinate 18 of the graph, while the operating hours that have passed are plotted along the abscissa 17.

The probability for a failure of the arrangement can be essentially grouped into three time intervals I, II and III.

The first time interval I is the burn-in time interval. Such burn-in effects can occur if new components are present in the hydraulic circuit. Typically, such new components show a higher friction and potentially not yet detected manufacture errors. Therefore, the failure rate 16 is typically comparatively high.

Usually, the failure rate 16 will reduce initially towards a boundary value 20. The failure rate 16 then usually remains essentially constant during the time interval II. Time interval II is typically referred to as the useful lifetime of the arrangement. The length of this time interval II depends of course on the type of component(s) and the quality of its/their design and construction. During this time interval, the failure rate 16 remains comparatively constant over an elongated time span.

After a certain operating time, however, the failure rate 16 will increase again. This is the so-called wear-out phase III.

Only for completeness, it should be mentioned that the length of the first time interval I and/or (in particular) the useful lifetime interval II is not necessarily the same, even for identical arrangements. In particular, heavy use of some machinery will usually shorten the length of first time interval I and/or (in particular) useful lifetime interval II (and therefore wear-out phase III will be reached sooner). Additionally or alternatively, the length of first time interval I and/or useful lifetime interval II might be shortened (even significantly) due to some pre-major failures (which can come from some undetected faults of certain components) and/or from unforeseen extraordinary conditions. It is to be noted that the cause for an early failure of a certain component might stem from the different component as well. As an example: if metal debris from a fluid reservoir will be transported into a pump, the pump can break very soon, albeit the problem lies somewhere else. Contrary to the above, first time interval I and/or useful lifetime interval II can of course be longer, in case the machine is operated in a somewhat relaxed way.

The optimum time for maintenance lies typically at the changeover time 19 in between useful life interval II and wear-out interval III, or shortly afterwards (so that the failure rate 16 is still sufficiently low, albeit somewhat higher than the boundary value 20 of the failure rate 16.

Figure 3:
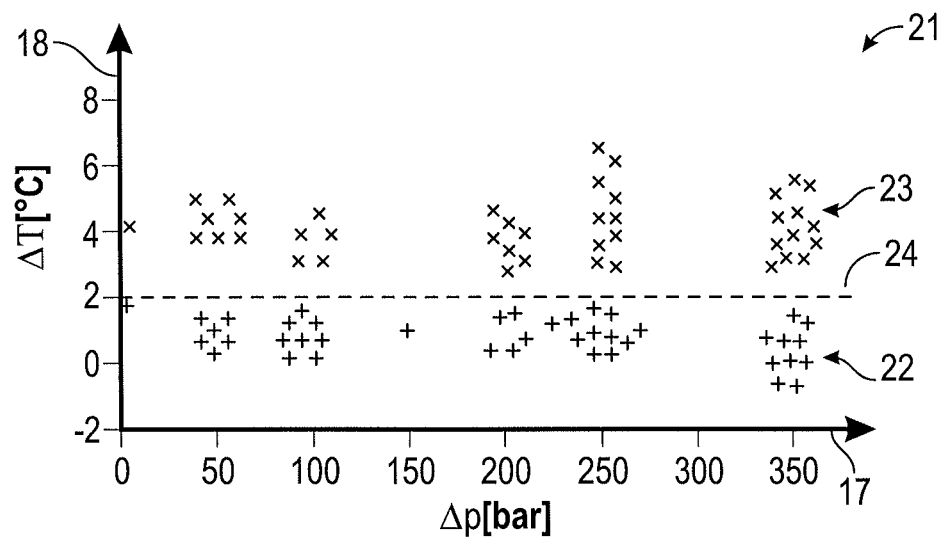
FIG. 3: initial measurements of the temperature increase of a normally operating hydraulic circuit arrangement against a hydraulic circuit arrangement, comprising leaks.

FIG. 3 shows a measurement data plot 21 from first experiments. The data shown, as well as the threshold line 24, are to be understood as a possible embodiment that can be different, in particular in connection with other arrangements. The vertical crosses 22 of the measured data plot 21 indicate a run-in fluid flow arrangement (for example the closed loop hydraulic system 1, as shown in FIG. 1) with essentially no fluid leakage. Essentially no fluid leakage means that this reflects the typical fluid leakage that is present during the useful life interval II (see FIG. 2), and which can never be completely avoided. Furthermore, several X-type crosses 23 are shown in the measured data plot 21. The X-type crosses 23 represent measurement taken from a fluid flow arrangement with an increased leakage flow. Such an increased leakage flow is typical for components that suffered a certain wear, and that consequently do show an increased play between them and other (neighbouring/adjacent) components; this is a behaviour typical for a fluid flow arrangement during the wear-out phase III (see FIG. 2).

On the abscissa 17 ("x-axis") of the measured data plot 21, the pressure difference across a typical component of a hydraulic circuit arrangement is shown (for example the pressure difference between the fluid intake port and the fluid outlet port of a main hydraulic pump 2 and/or of a main hydraulic motor 3; compare with FIG. 1). On the ordinate 18 ("y-axis") of the measured data plot 21, the temperature difference between the actually measured temperature and the reference temperature is plotted.

As can be clearly seen from FIG. 3, the different sets of measurement values are quite clearly separated from each other. Therefore, a threshold line 24 can be drawn. If a measurement will yield a point above the threshold line 24, one can conclude with a pretty high probability that the respective component is already in its wear-out phase III, and has to be replaced. As mentioned earlier, such a temperature increase can also come from unforeseen extraordinary conditions, early faults of some components, and the like. If, on the contrary, the measurement point is below the threshold line 24, the component is still in its useful life phase II, at least with a high probability.

Threshold line 24 might look different, as well. In particular, it is possible that threshold line 24 might be modified, based on an adaption algorithm, using machine learning techniques.

Figure 4:
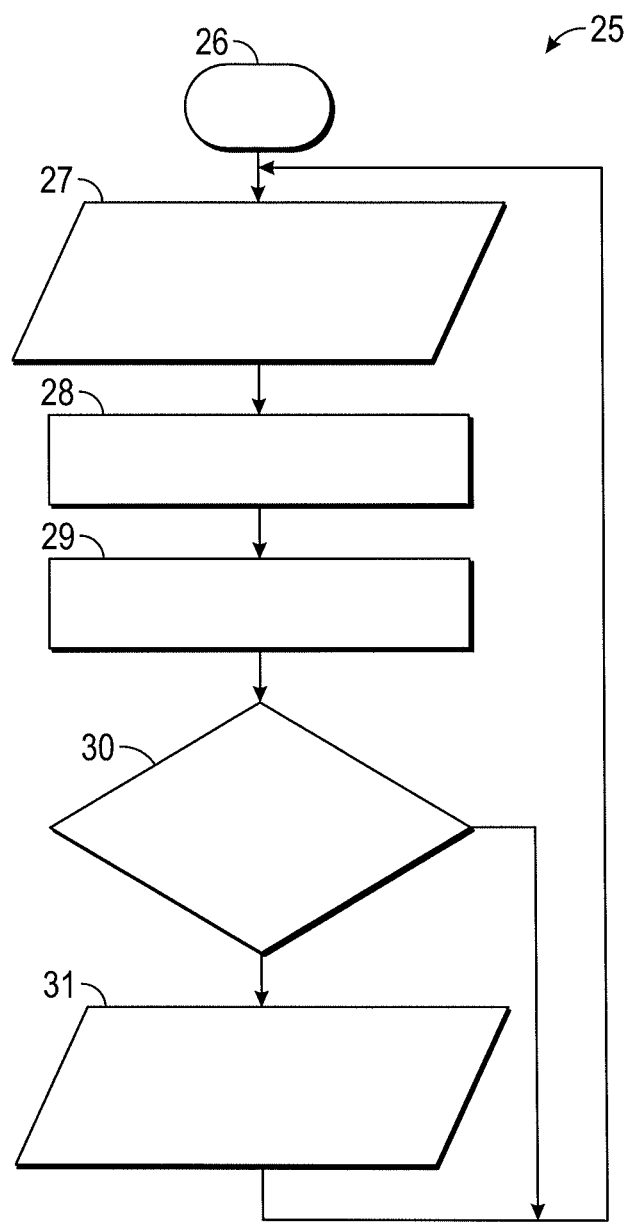
FIG. 4: a flow chart of an embodiment of a method for determining the health status of a hydraulic circuit arrangement.

Based on these observations and first experiments, in FIG. 4 a possible embodiment of a method 25 of determining the health status of hydraulic circuit arrangement 1 is shown as a flow chart.

After start-up 26 of the system, temperature data from the sensor 12 is read in 27 into the controller 13. The thus received actual temperature data is modified 28, so that load characteristics, environmental characteristics, heat dissipation effects and so on of the hydraulic circuit arrangement 1 are accounted for. Within the same modification step 28, the reference temperature can be modified as well, for example by taking into account previously determined health status data.

Once the corrected actual temperature information and the corrected reference temperature information is obtained (calculated in step 28), the actual comparison is made and the health status data is determined therefrom in consecutive health status determination step 29.

After the health status is determined 29, a check 30 is performed whether the health status is still within tolerable limits, or not. In case the health status 30 is above a certain threshold, a warning information 31 is generated and the algorithm 25 jumps back to the start. If, however, the health status is still below a certain threshold, the algorithm 25 simply jumps back, without generating a warning information.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method of determining a health status of a hydraulic circuit arrangement comprising at least one hydraulic fluid working machine, wherein the health status is determined using at least in part an actual temperature information of the hydraulic circuit arrangement that is compared to an expected temperature information of the hydraulic circuit arrangement, wherein the actual temperature information is determined, at least in part, by measuring a temperature development over time, and wherein the expected temperature information is determined, at least in part, by using a temperature that is based on a model of the hydraulic circuit arrangement.

2. The method according to claim 1, wherein the expected temperature information is determined at least in part from one or more of the following group of temperature information gaining methods: using a fixed temperature; using a temperature that is based on measurements of the hydraulic circuit arrangement; modifying a temperature based on operating time; modifying a temperature based on operating load; modifying a temperature based on operating load history; modifying a temperature based on environmental parameters; modifying a temperature based on actual temperature information history; modifying a temperature based on the type of hydraulic fluid; modifying a temperature based on hydraulic fluid alterations; and/or modifying a temperature on previous health status data.

3. The method according to claim 1, wherein the actual temperature information is determined at least in part from one or more of the following group of temperature information gaining methods: measuring a hydraulic fluid temperature; measuring a mechanical power introduced into the hydraulic circuit arrangement; measuring a mechanical power extracted from the hydraulic circuit arrangement; measuring heat dissipation of the hydraulic circuit arrangement to an environment; and/or replacing or modifying a measurement by calculations.

4. The method according to claim 1, wherein the health status comprises at least one, two or a plurality of health status levels, in particular at least one health status level is taken from the following group of health status levels: indication of full operability of the hydraulic circuit arrangement; indication of remaining hours of full operability of the hydraulic circuit arrangement; remaining operating hours before preventive maintenance; remaining hours before maintenance; indication of suggested preventive maintenance; indication of required preventive maintenance; indication of suggested maintenance; indication of recommended maintenance; indication of highly recommended maintenance; indication of recommended non-use of equipment; indication of imminent malfunction; indication of malfunction.

5. The method according to claim 1, wherein the health status is influenced by previous health status information.

6. The method according to claim 1, wherein the health status can be externally modified, in particular based on inspection results and/or on maintenance performed.

7. The method according to claim 1, wherein the health status is determined, at least in part, using machine learning methodologies, processes, and systems.

8. The method according to claim 1, wherein the health status is indicated to an operator of the hydraulic circuit arrangement, stored in a memory device for readout by a person, and/or transmitted to an external device.

9. The method according to claim 1, wherein the health status and/or the expected temperature information and/or the actual temperature information is a vectorial value.

10. A control unit for the hydraulic circuit arrangement that is designed and arranged in a way to perform, at least at times, the method according to claim 1.

11. The control unit according to claim 10, wherein the control unit is an electronic control unit, a programmable control unit, an electronic controller, and/or a device comprising a numerical processing device.

12. The hydraulic circuit arrangement, wherein the hydraulic circuit arrangement is operated, at least at times, according to the method according to claim 1.

13. The hydraulic circuit arrangement according to claim 10 that is used for a mobile device, in particular for an off-road vehicle and/or a construction site vehicle.

14. The method according to claim 2, wherein the actual temperature information is determined at least in part from one or more the following group of temperature information gaining methods: measuring a hydraulic fluid temperature; measuring a mechanical power introduced into the hydraulic circuit arrangement; measuring a mechanical power extracted from the hydraulic circuit arrangement; measuring heat dissipation of the hydraulic circuit arrangement to a environment; and/or replacing or modifying a measurement by calculations.

15. The method according to claim 2, wherein the health status comprises at least one, two or a plurality of health status levels, in particular at least one health status level is taken from the following group of health status levels: indication of full operability of the hydraulic circuit arrangement; indication of remaining hours of full operability of the hydraulic circuit arrangement; remaining operating hours before preventive maintenance; remaining hours before maintenance; indication of suggested preventive maintenance; indication of required preventive maintenance; indication of suggested maintenance; indication of recommended maintenance; indication of highly recommended maintenance; indication of recommended non-use of equipment; indication of imminent malfunction; indication of malfunction.

16. The method according to claim 3, wherein the health status comprises at least one, two or a plurality of health status levels, in particular at least one health status level is taken from the following group of health status levels: indication of full operability of the hydraulic circuit arrangement; indication of remaining hours of full operability of the hydraulic circuit arrangement; remaining operating hours before preventive maintenance; remaining hours before maintenance; indication of suggested preventive maintenance; indication of required preventive maintenance; indication of suggested maintenance; indication of recommended maintenance; indication of highly recommended maintenance; indication of recommended non-use of equipment; indication of imminent malfunction; indication of malfunction.

17. The method according to claim 2, wherein the health status is influenced by previous health status information.

18. The method according to claim 3, wherein the health status is influenced by previous health status information.

19. The method according to claim 4, wherein the health status is influenced by previous health status information.

20. The hydraulic circuit arrangement, wherein the hydraulic circuit arrangement is operated, at least at times, according to the method according to claim 1 and/or in that the hydraulic circuit arrangement comprises a control unit wherein the health status is indicated to an operator of the hydraulic circuit arrangement, stored in a memory device for readout by a person, and/or transmitted to an external device.

* * * * *